(12) United States Patent
Deng et al.

(10) Patent No.: US 11,708,130 B1
(45) Date of Patent: Jul. 25, 2023

(54) EXTENDABLE AND RETRACTABLE FAIRING FOR CONTAINER SHIP AND CONTROL METHOD THEREOF

(71) Applicant: Sun Yat-sen University, Guangdong (CN)

(72) Inventors: Rui Deng, Guangdong (CN); Zhijie Song, Guangdong (CN); Shigang Wang, Guangdong (CN); Hang Ren, Guangdong (CN); Xiang Yu, Guangdong (CN); Hailong Liu, Guangdong (CN); Tiecheng Wu, Guangdong (CN)

(73) Assignee: Sun Yat-sen University, Guangzhou (CN)

( * ) Notice: Subject to any disclaimer, the term of this patent is extended or adjusted under 35 U.S.C. 154(b) by 0 days.

(21) Appl. No.: 18/098,686

(22) Filed: Jan. 18, 2023

(30) Foreign Application Priority Data

Jan. 18, 2022 (CN) .......................... 202210053195.0

(51) Int. Cl.
*B63B 17/00* (2006.01)
*B63B 15/00* (2006.01)
*B63B 1/32* (2006.01)

(52) U.S. Cl.
CPC ............ *B63B 17/00* (2013.01); *B63B 1/32* (2013.01); *B63B 15/00* (2013.01); *B63B 2017/0045* (2013.01)

(58) Field of Classification Search
CPC ......... B63B 17/00; B63B 17/02; B63B 15/00; B63B 1/32

USPC ........................................................ 114/361
See application file for complete search history.

(56) References Cited

U.S. PATENT DOCUMENTS

| 7,249,568 B1 * | 7/2007 | Cultrara .................. B63B 17/02 114/361 |
| 8,359,994 B1 * | 1/2013 | Highfield ................ B63B 19/18 114/361 |

FOREIGN PATENT DOCUMENTS

| CN | 105480384 A | 4/2016 | |
| KR | 20150137648 A | 12/2015 | |
| KR | 1616320 B1 * | 4/2016 | ............. B63B 15/00 |
| KR | 200492529 Y1 * | 11/2020 | ............. B63B 15/00 |

\* cited by examiner

*Primary Examiner* — Lars A Olson (57) ABSTRACT

Disclosed are an extendable and retractable fairing for a container ship and a control method thereof. The extendable and retractable fairing includes a controller, a support skeleton, a wind velocity detector, a first flexible deflector, second and third flexible deflectors, and accommodation mechanisms. The third flexible deflectors are sequentially arranged between the first and second flexible deflectors; the support skeleton includes guide-track grooves; the second and third flexible deflectors each are slidably provided in a corresponding guide-track groove; the accommodation mechanisms each include an accommodation winding tube and a drive motor; the accommodation winding tube is provided at one side of a deck at the bow; the drive motor is connected to the accommodation winding tube; the wind velocity detector is provided on the first flexible deflector; and the second and third flexible deflectors each are provided in the accommodation winding tube.

20 Claims, 8 Drawing Sheets

EXTENDABLE AND RETRACTABLE FAIRING FOR CONTAINER SHIP AND CONTROL METHOD THEREOF

CROSS REFERENCE TO RELATED APPLICATIONS

The present application claims the benefit of Chinese Patent Application No. 202210053195.0 filed on Jan. 18, 2022, the contents of which are incorporated herein by reference in their entirety.

TECHNICAL FIELD

The present disclosure relates to the technical field of ships, and in particular to an extendable and retractable fairing for a container ship and a control method thereof.

BACKGROUND

With the rapid economic development, continuous technical improvement, and growing global energy demand, the marine transportation is becoming more frequent and the ship industry is attaching importance to high-quality and sustainable development. Ships for loading containers are termed as container ships. Many containers are stacked on a deck of a ship. A superstructure formed by the stacked containers forms an area with large wind resistance that cannot be ignored. By reducing the wind resistance, a total resistance of the ship during navigation can be reduced, a velocity of the ship can be accelerated, energy consumption of the ship can be lowered, and a transportation efficiency of the ship can be improved.

A fairing at a bow of the ship can be effective in saving the energy and reducing the resistance. However, the existing fairing is generally fixed at the bow of the ship, thus it is difficult to control an opening and a closing of the fairing according to an actual condition of the navigation. As a result, the fairing covers the bow in both a use state and a non-use state, and occupies a large area on the deck.

SUMMARY

In view of the above problems, an objective of the present disclosure is to provide an extendable and retractable fairing for a container ship and a control method thereof, to solve the problem that the existing fairing is fixed and hardly controlled in opening and closing, such that the fairing covers the bow in both a use state and a non-use state, and occupies a large area on the deck.

To achieve the above objective, the present disclosure adopts the following technical solutions:

An aspect of the present disclosure provides an extendable and retractable fairing for a container ship, including a controller, a support skeleton, a wind velocity detector, a first flexible deflector, second flexible deflectors, a plurality of third flexible deflectors, and a plurality of accommodation mechanisms, where the first flexible deflector is fixed at a front end of a deck at a bow, and a front end of the first flexible deflector is coincided to a preset point at the front end of the deck at the bow; the second flexible deflectors are respectively provided at two sides of a rear end of the deck at the bow; the plurality of the third flexible deflectors are sequentially arranged between the first flexible deflector and the second flexible deflectors; a highest point of each of the second flexible deflectors is lower than a highest point of an adjacent one of the third flexible deflectors; and a cavity is formed therebetween the first flexible deflector, the third flexible deflectors, and the deck at the bow;

the support skeleton includes a plurality of guide-track grooves that are provided at intervals; and the second flexible deflectors and the third flexible deflectors each are slidably provided in a corresponding guide-track groove;

the accommodation mechanisms each include an accommodation winding tube, and a drive motor; the accommodation winding tube is provided at one side of the deck at the bow; and the drive motor is in transmission connection with the accommodation winding tube;

the wind velocity detector is provided on the first flexible deflector, and configured to measure a wind velocity; and the wind velocity detector and the drive motor are electrically connected to the controller; the second flexible deflector and the third flexible deflector each are provided in the corresponding accommodation winding tube in a winding manner; and the controller controls, according to a detection signal of the wind velocity detector, the drive motor to drive the accommodation winding tube to rotate, such that the second flexible deflector or the third flexible deflector extends slidably along the corresponding guide-track groove, or the second flexible deflector and the third flexible deflector each are wound on the corresponding accommodation winding tube.

Preferably, the wind velocity detector includes a first wind pressure transducer and a second wind pressure transducer; the first wind pressure transducer is provided inside the first flexible deflector, and configured to measure a static pressure inside the first flexible deflector; and the second wind pressure transducer is fixed on an outer wall of the first flexible deflector, and configured to measure a dynamic pressure outside the first flexible deflector.

Preferably, there are a plurality of the second wind pressure transducers; and the plurality of the second wind pressure transducers are provided at intervals along a circumference of the outer wall of the first flexible deflector.

Preferably, the accommodation mechanisms each further include an extensible belt; the extensible belt includes one end fixed at a side of the deck at the bow provided with the accommodation winding tube, and the other end connected to the third flexible deflector; in response to extension of the third flexible deflector, the extensible belt is tensioned; and in response to retraction of the third flexible deflector, the extensible belt is loosened.

Preferably, the support skeleton includes a support beam and a support frame; the support beam includes a bottom fixed on the deck at the bow, and a top abutting against the support frame; two sides of the support frame are fixed with an edge of the deck at the bow; and the guide-track grooves are provided on the support frame.

Preferably, the first flexible deflector, the second flexible deflectors and the third flexible deflectors each are a curved plate; and the first flexible deflector and the plurality of third flexible deflectors are formed into a curved fairing body.

Preferably, a side from a vertex of a rear end to a vertex of a front end of the second flexible deflector is in an arc shape.

Another aspect of the present disclosure provides a control method of the extendable and retractable fairing for a container ship, including the following steps:

step detecting, by the wind velocity detector, a present wind velocity of a ship in navigation, and transmitting a detection signal to the controller;

step S2: receiving, by the controller, the detection signal and determining a scale of the present wind velocity;

step S3: determining, according to the scale of the present wind velocity, a number of the third flexible deflectors to be opened, and labeling the number as a pre-opening number;

step S4: determining a number of the third flexible deflectors opened at present, and labeling the number as a present opening number; and step S5: comparing the present opening number with the pre-opening number; controlling, if the present opening number is less than the pre-opening number, a corresponding drive motor to work, such that the third flexible deflector extends slidably along a corresponding guide-track groove to make the present opening number equal to the pre-opening number; and controlling, if the present opening number is greater than the pre-opening number, a corresponding drive motor to work, such that the third flexible deflector is wound on a corresponding accommodation winding tube to make the present opening number equal to the pre-opening number.

Preferably, the detecting, by the wind velocity detector, a present wind velocity of a ship in navigation includes:

measuring, by a first wind pressure transducer, a static pressure inside the first flexible deflector;

measuring, by a second wind pressure transducer, a dynamic pressure outside the first flexible deflector; and calculating the present wind velocity according to the static pressure and the dynamic pressure.

Preferably, when there are a plurality of the second wind pressure transducers, the detecting, by the wind velocity detector, a present wind velocity of a ship in navigation includes:

measuring, by the first wind pressure transducer, a static pressure inside the first flexible deflector;

measuring, by each of the second wind pressure transducers, each of dynamic pressures outside the first flexible deflector;

calculating, according to the static pressure and each of the dynamic pressure, each of wind velocities corresponding to each of the second wind pressure transducers; and calculating the present wind velocity according to each of the wind velocities corresponding to each of the second wind pressure transducers.

The extendable and retractable fairing for a container ship and the control method thereof provided by the embodiments of the present disclosure achieve the following beneficial effects over the prior art:

According to the extendable and retractable fairing for a container ship provided by the embodiments of the present disclosure, the first flexible deflector, the second flexible deflectors and the third flexible deflectors are formed into a fairing cover body. This optimizes an airflow field around a hull, effectively reduces an air resistance caused by a superstructure or a stacked cargo on the deck, and is more beneficial for energy saving, emission reduction and speed acceleration. Moreover, the third flexible deflectors are extendable and retractable and correspondingly provided with the accommodation mechanisms. The accommodation mechanisms are configured to accommodate the third flexible deflectors. The controller can control extension and retraction of the third flexible deflectors according to a detection result of the wind velocity detector, such that a number of opened third flexible deflectors is matched with a present wind velocity. The third flexible deflectors each can be accommodated and retracted into the accommodation winding tube when not used, which does not occupy the space of the deck, and increases a ship-handling field of view (FOV) to the utmost extent.

In the figures: 1: first flexible deflector, 2: second flexible deflector, 3: third flexible deflector, 4: bow fixing point, 5: guide-track groove, 5A: first guide-track groove, 5B (C): second guide-track groove, 6: guide track, 7: support beam, 8: support frame, 9: drive motor, 10: accommodation winding tube, 11 (11A, 11B): extensible belt, 12: superstructure, 13: ship, 14: deck, 15: controller, 16: support skeleton, 17: wind velocity detector, 17A: first wind pressure transducer, 17B: second wind pressure transducer, 18: accommodation mechanism, 19: flow diversion plate, 20: elastic member, 21: air bag, 22: air charging-discharging device, 23: air tube, 24: flow guide groove, 25: groove, 26: reel, 27: drum, and 28: position transducer.

DETAILED DESCRIPTION

The specific implementations of the present disclosure are described in more detail below with reference to the accompanying drawings and embodiments. The following embodiments are illustrative of the present disclosure and should not be construed as limiting of the scope of the present disclosure.

In the description of the present disclosure, it is to be noted that the positive X direction is from a stern to a bow, the positive Y direction is from a starboard to a port, the positive Z direction is from a ship bottom to a deck, the "front" direction refers to a bow direction, and the "rear" direction refers to a stern direction.

As shown in FIGS. 1-4, a preferred embodiment of the present disclosure provides an extendable and retractable fairing for a container ship, which covers a deck 14 at a bow of a ship 13. The fairing includes a controller 15, a support skeleton 16, a wind velocity detector 17, a first flexible deflector 1, second flexible deflectors 2, a plurality of third flexible deflectors 3, and a plurality of accommodation mechanisms 18.

The first flexible deflector 1 and the third flexible deflectors 3 are formed into a fairing body to cover the deck 14 at the bow. The first flexible deflector 1 is fixed at a front end of the deck 14 at the bow. A front end of the first flexible deflector 1 is coincided to a preset point at the front end of the deck 14 at the bow. The preset point refers to a forefront end of the bow, namely a bow fixing point 4 in FIG. 1. The second flexible deflectors 2 are respectively provided at two sides of a rear end of the deck 14 at the bow. The second flexible deflectors 2 each include a front end abutting against a third flexible deflector 3, and a rear end abutting against a superstructure 12 or a cargo stacked place, thereby serving as a bulwark. The plurality of the third flexible deflectors 3 are sequentially arranged between the first flexible deflector 1 and the second flexible deflectors 2. In the figure, only one third flexible deflector 3 is shown. A highest point of each of the second flexible deflectors 2 is lower than a highest point of an adjacent one of the third flexible deflectors 3. A cavity is formed therebetween the first flexible deflector 1, the third flexible deflectors 3, and the deck 14 at the bow.

The support skeleton includes a plurality of guide-track grooves 5 that are provided at intervals. The second flexible deflectors 2 and the third flexible deflectors 3 each are slidably provided in a corresponding guide-track groove 5. A guide track 6 is provided in the guide-track groove 5. The second flexible deflector 2 or the third flexible deflector 3 is slidably provided on the guide track 6. The accommodation mechanisms 18 each include an accommodation winding tube 10 and a drive motor 9. The accommodation winding tube 10 is provided at one side of the deck 14 at the bow. The drive motor 9 is in transmission connection with the accommodation winding tube 10. The second flexible deflector 2 and the third flexible deflector 3 each are provided with a corresponding one of the accommodation mechanisms 18. A manner that the accommodation mechanism 18 drives the second flexible deflector 2 or the third flexible deflector 3 is the same. Herein, descriptions are made only to one third flexible deflector 3. When the drive motor 9 drives the accommodation winding tube 10 to rotate clockwise, the third flexible deflector 3 slides along the corresponding guide-track groove 5, such that the third flexible deflector 3 is gradually wound on the accommodation winding tube 10. The third flexible deflector 3 is accommodated into one side of the deck 14 of the ship through the accommodation winding tube 10, which allows the third flexible deflector 3 in an idle state not to occupy a space on the deck 14 of the ship. When the drive motor 9 drives the accommodation winding tube 10 to rotate counterclockwise, the third flexible deflector 3 slides reversely along the corresponding guide-track groove 5, such that the third flexible deflector 3 extends along the guide-track groove 5 to gradually cover the deck 14 of the ship, thereby forming a part of the fairing body, improving an airflow field around a hull, and reducing a wind resistance of the superstructure 12 or the stacked cargo.

The wind velocity detector 17 is provided on the first flexible deflector 1, and configured to measure a wind velocity. The wind velocity detector 17 and the drive motor 9 are electrically connected to the controller 15. The second flexible deflector 2 and the third flexible deflector 3 each are provided in the corresponding accommodation winding tube 10 in a winding manner. The controller 15 controls, according to a detection signal of the wind velocity detector 17, the drive motor 9 to drive the accommodation winding tube 10 to rotate, such that the second flexible deflector 2 or the third flexible deflector 3 extends slidably along the corresponding guide-track groove 5, or the second flexible deflector 2 and the third flexible deflector 3 each are wound on the corresponding accommodation winding tube 10. Specifically, a present wind velocity of a ship in navigation is acquired according to a wind velocity detection signal, and a scale is determined according to the present wind velocity. A number of the third flexible deflectors 3 to be opened is determined according to the scale, and labeled as a pre-opening number. The opening refers to a state in which the third flexible deflector 3 extends along the guide-track groove 5 to cover the deck 14 of the ship to form a part of the fairing body. A present opening number of the third flexible deflectors 3 is compared with the pre-opening number. If the pre-opening number is greater than the present opening number, a corresponding drive motor 9 is controlled to work, such that the third flexible deflector 3 extends slidably along a corresponding guide-track groove 5 to make the pre-opening number equal to the present opening number. If the pre-opening number is less than the present opening number, a corresponding drive motor 9 is controlled to work, such that the third flexible deflector 3 is wound on a corresponding accommodation winding tube 10 to make the pre-opening number equal to the present opening number. If the pre-opening number is equal to the present opening number, the controller 15 controls the third flexible deflectors 3 not to work. For the third flexible deflectors 3, the pre-opening number is matched with the present opening number, such that a number of the third flexible deflectors 3 covering the deck 14 at the bow is matched with a present wind velocity of the ship in navigation. Opened third flexible deflectors are formed into an appropriate fairing body with the first flexible deflector to cover the deck 14 at the bow. Therefore, not only can the airflow field around the hull be improved, but also a phenomenon that a large fairing body covers the deck 14 at the bow to obstruct a ship-handling FOV is prevented.

According to the present disclosure, the first flexible deflector 1, the second flexible deflectors 2 and the third flexible deflectors 3 are formed into a fairing cover body. This optimizes an airflow field around the hull, improves disordered air motion at a front end of the ship, and effectively reduces a pressure resistance caused by the superstructure 12 or the piled cargo on the deck 14 of the ship. Meanwhile, the stable airflow forms a lubricating air layer at a periphery of the hull, which reduces a frictional resistance to some extent, and is more beneficial for energy saving, emission reduction and speed acceleration. Moreover, the third flexible deflectors 3 are extendable and retractable and correspondingly provided with the accommodation mechanisms 18. The accommodation mechanisms 18 are configured to accommodate the third flexible deflectors 3. The controller 15 can control extension and retraction of the third flexible deflectors 3 according to a detection result of the wind velocity detector 17, such that a number of opened third flexible deflectors 3 is matched with a present wind velocity. The third flexible deflectors 3 each can be accommodated and retracted into the accommodation winding tube 10 when not used, which does not occupy the space of the deck 14, and increases a ship-handling FOV to the utmost extent.

Figure 1:
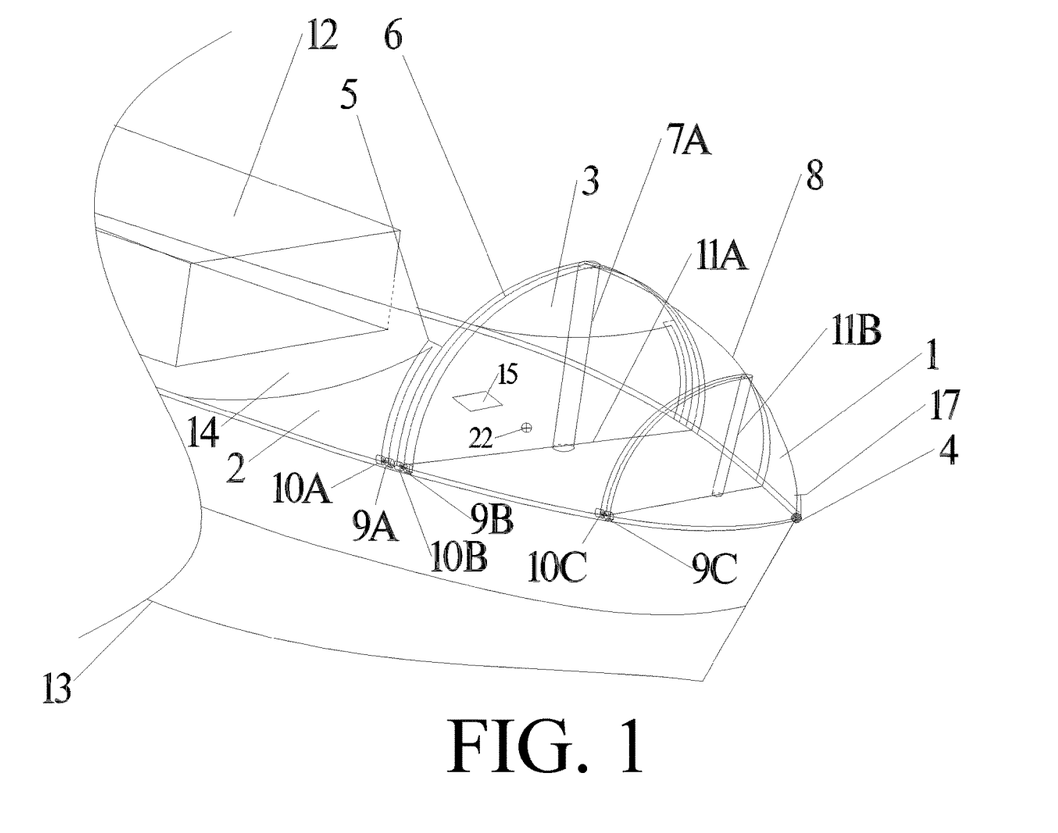
FIG. 1 is a schematic structural view of an extendable and retractable fairing for a container ship according to an embodiment of the present disclosure.
Figure 2:
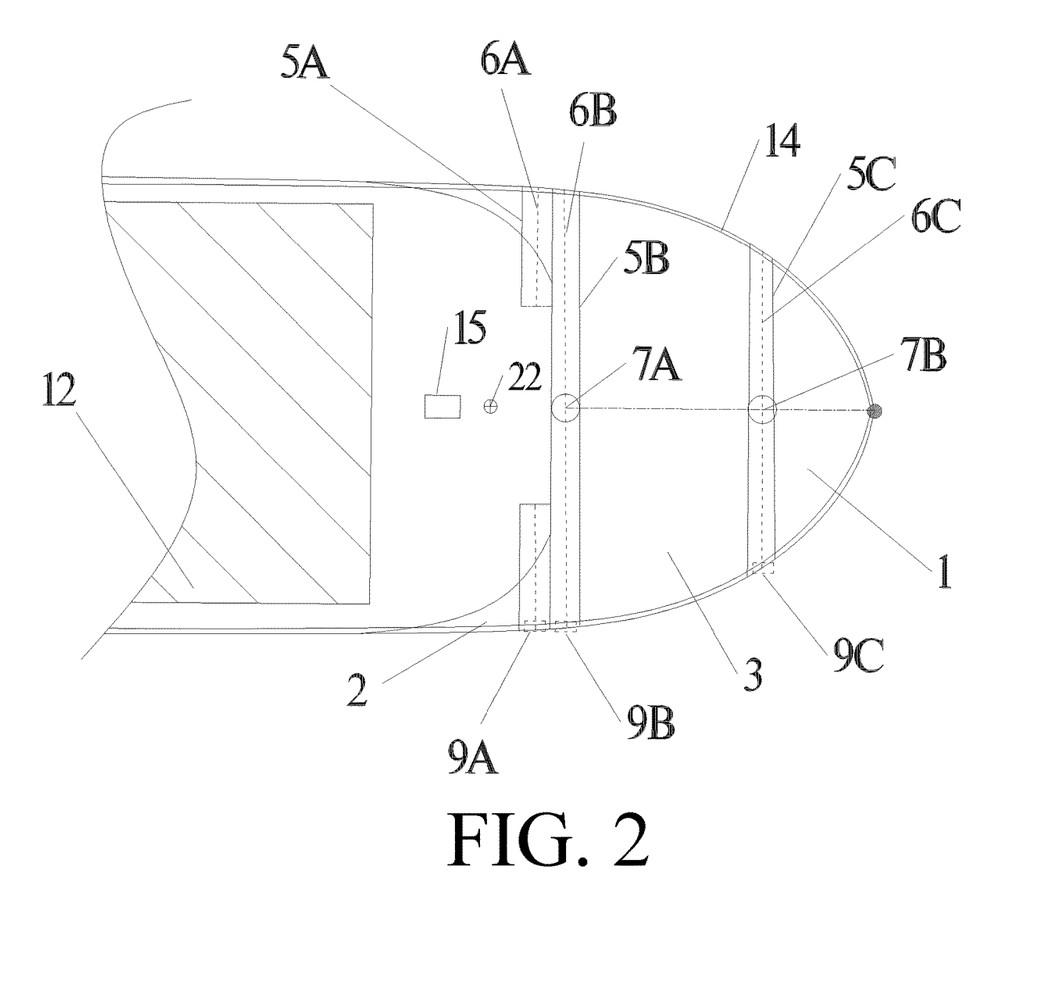
FIG. 2 is a Z-direction top view of the extendable and retractable fairing for a container ship in FIG. 1.
Figure 3:
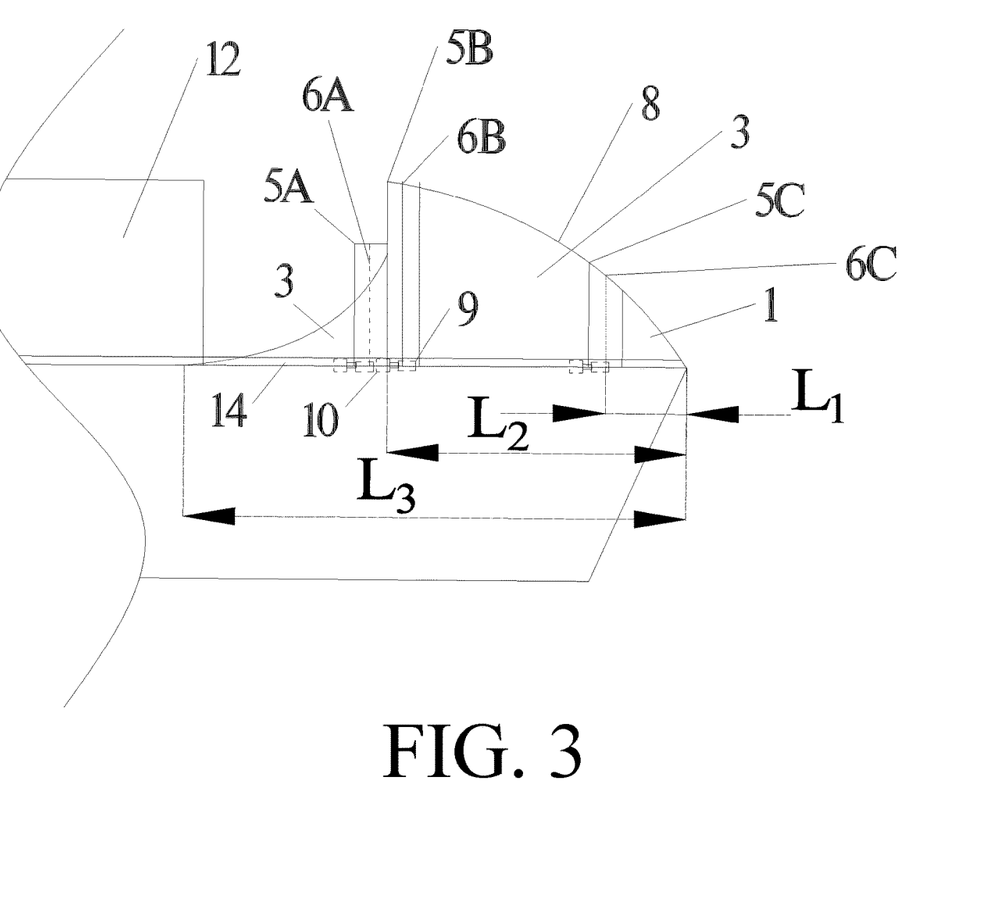
FIG. 3 is an X-direction transverse sectional view of the extendable and retractable fairing for a container ship in FIG. 1.
Figure 4:
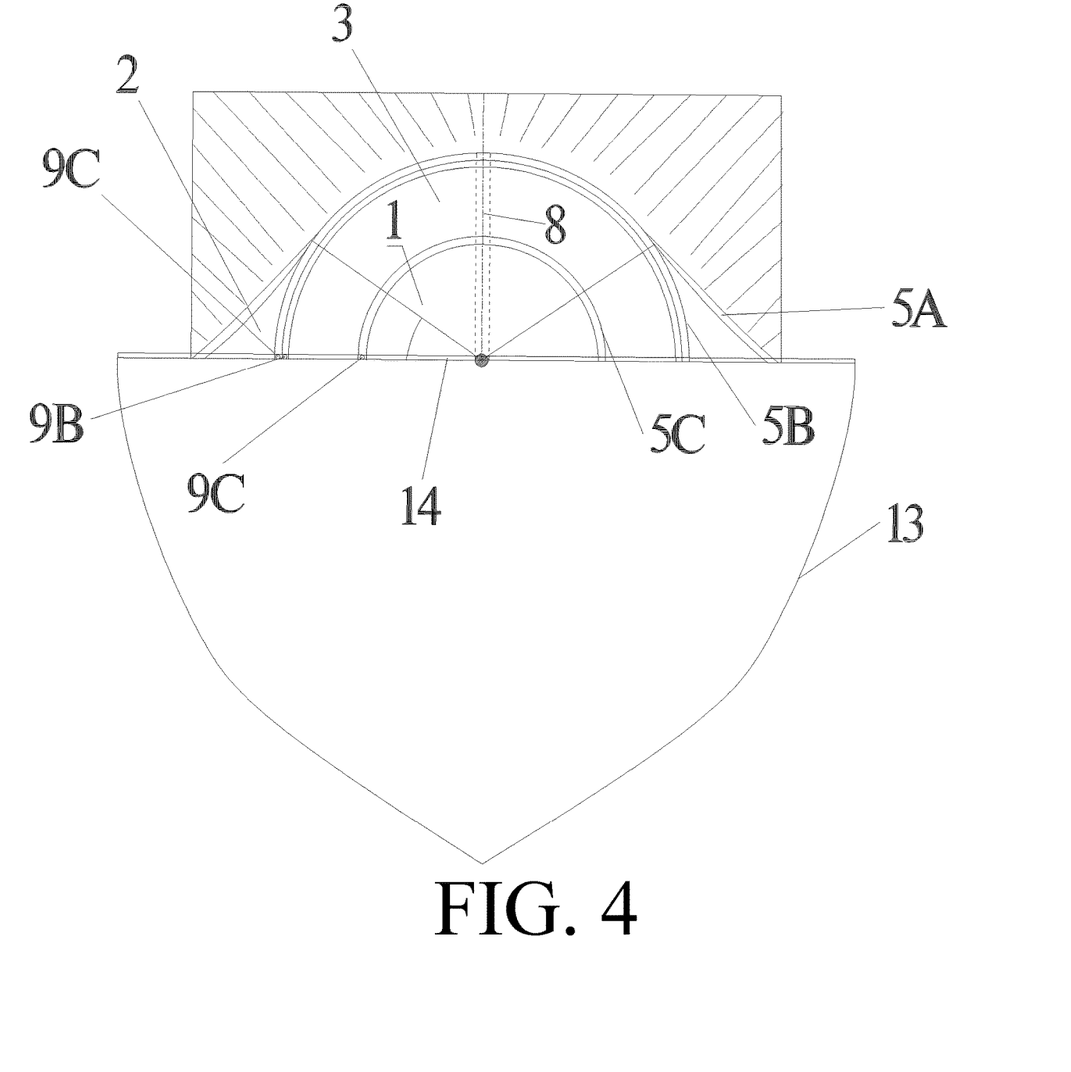
FIG. 4 is a Y-direction longitudinal sectional view of the extendable and retractable fairing for a container ship in FIG. 1.

In the embodiment, the first flexible deflector 1, the second flexible deflectors 2 and the third flexible deflectors 3 each are a curved plate. The first flexible deflector 1 is fixed at the front end of the deck 14 at the bow. The third flexible deflector 3 extends from the port side of the ship to the starboard side of the ship. The front end of the second flexible deflector 2 extends from the port side of the ship or the starboard side of the ship. The first flexible deflector 1 and the plurality of the third flexible deflectors 3 are formed into a curved fairing body. A length of the first flexible deflector 1 in the positive X direction is less than a total length of the third flexible deflectors 3 in the positive X direction. A maximum length of the curved fairing body in the positive X direction is not greater than a distance from the superstructure 12 or the stacked cargo to the forefront end of the deck 14. A maximum width of the curved fairing body is not greater than a maximum width of the hull. As shown in FIG. 3, an X-direction transverse section of the curved fairing body is a smooth continuous curve, and may be a polynomial curve, which simplifies the production process, facilitates the production, and reduces the cost.

In the present disclosure, it is to be noted that curved surfaces of the third flexible deflectors 3 have different radians. From the bow to the stern, the third flexible deflectors 3 are sequentially protruded and extend upward, such that the X-direction transverse section of the curved fairing body formed by the third flexible deflectors 3 and the first flexible deflector 1 is the smooth continuous curve.

Figure 7:
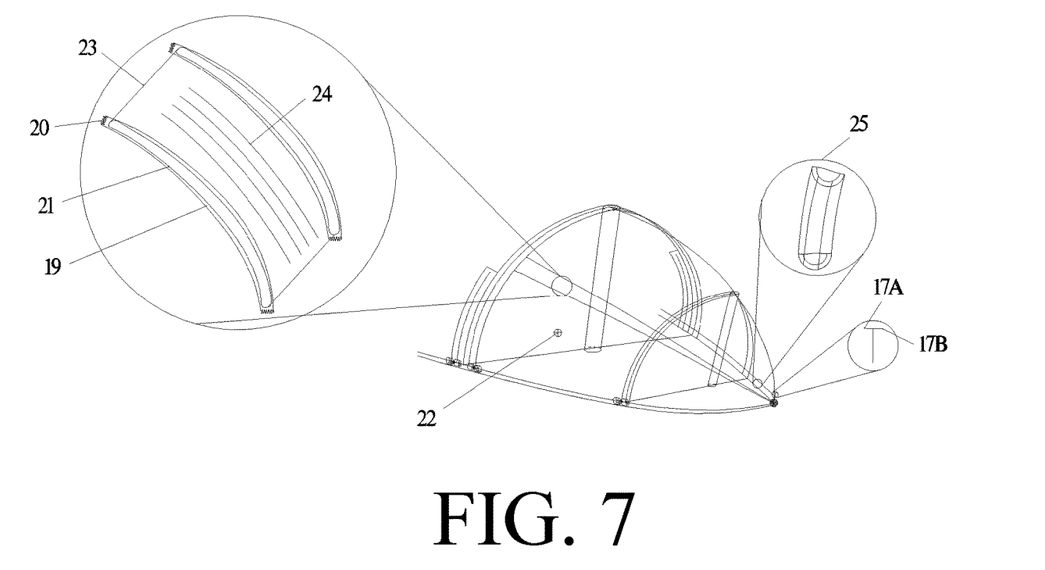
FIG. 7 is a schematic view of a flow guide mechanism in the extendable and retractable fairing for a container ship in FIG. 1.

Optionally, the first flexible deflector 1 and the third flexible deflector 3 each are provided thereon with a plurality of flow guide mechanisms to guide air flowing to the fairing, which further optimizes the airflow field around the hull, and reduces the air resistance caused by the superstructure or the stacked cargo on the deck 14 of the ship. The flow guide mechanisms on the first flexible deflector 1 and on the third flexible deflectors 3 are the same structurally. Herein, descriptions are made only to the flow guide mechanisms on the first flexible deflector 1. The flow guide mechanisms each include a flow diversion plate 19, elastic members 20, an air bag 21, and an air charging-discharging device 22. The flow diversion plate 19 is a curved plate. A curved surface of the flow diversion plate 19 has a same radian as a curved surface of the first flexible deflector thereunder, such that the flow diversion plate 19 can be attached to a surface of the first flexible deflector. Two ends of the flow diversion plate 19 each are provided with one elastic member 20. The elastic member 20 is fixed between the flow diversion plate 19 and the first flexible deflector. The elastic member 20 includes one end fixed on a surface of the flow diversion plate 19, and the other end fixed on the surface of the first flexible deflector. The elastic member 20 may be a spring. The air bag 21 is provided between the flow diversion plate 19 and the first flexible deflector. The air bag 21 is located between two elastic members 20. The air bag 21 is connected to the air charging-discharging device 22 through an air tube 23. The air charging-discharging device 22 can be provided on the deck 14 at the bow. The air tube 23 can be provided along a lower surface of the first flexible deflector. Through the air tube 23, the air bag 21 is inflated or the air bag 21 is deflated. When the air charging-discharging device 22 charges air to the air bag 21, the air bag 21 is inflated to push the flow diversion plate 19 upward, such that the flow diversion plate 19 is protruded out of the surface of the first flexible deflector. When the air charging-discharging device 22 discharges the air from the air bag 21, the air bag 21 is deflated. The flow diversion plate 19 is restored under an elasticity of the elastic members 20 and attached to the surface of the first flexible deflector. There are a plurality of the flow guide mechanisms on the first flexible deflector 1. The flow guide mechanisms are provided at intervals along an arc surface (Y direction) of the first flexible deflector 1, as shown in FIG. 7. After air bags 21 of two adjacent flow guide mechanisms are inflated, a flow guide groove 24 is formed between the adjacent air bags 21 on the first flexible deflector to allow the airflow to pass through. Hence, a plurality of the flow guide grooves 24 can be formed at intervals in the first flexible deflector. When the airflow passes through the fairing, a part of the air flows on the surface of the flow diversion plate 19, and a part of the air flows in the flow guide groove 24. Therefore, the wind resistance can be reduced through the flow guide groove 24 and the air bags 21 on two sides thereof.

There are a plurality of the flow guide mechanisms on the third flexible deflector. The flow guide mechanisms are provided at intervals along an arc surface of the third flexible deflector. After air bags 21 of two adjacent flow guide mechanisms are inflated, a flow guide groove 24 is formed between the adjacent air bags 21 on the third flexible deflector. Hence, a plurality of the flow guide grooves 24 can be formed at intervals on the third flexible deflector. The flow guide groove 24 on the third flexible deflector is in one-to-one correspondence with the flow guide groove 24 on the first flexible deflector, and the two corresponding flow guide grooves 24 communicate with each other. Flow diversion plates 19 on the third flexible deflector correspond to flow diversion plates 19 on the first flexible deflector, such that an X-direction transverse section of a curved surface formed by the flow diversion plates 19 from the bow to the stern is a smooth continuous curve, and an X-direction transverse section for the flow guide grooves 24 on the first flexible deflector and the corresponding flow guide grooves 24 on the third flexible deflector is a smooth continuous curve, thereby enhancing an air guiding effect. It is to be noted that the flow guide mechanism on the third flexible deflector works when the third flexible deflector is opened. When the third flexible deflector is not opened, the flow guide mechanism does not work. The flow diversion plate 19 and the air bag 21 in the flow guide mechanism of the third flexible deflector can be wound and accommodated with the third flexible deflector. Further, a groove 25 is formed on the third flexible deflector. The elastic members 20 and the air bag 21 are arranged in the groove 25. The flow diversion plate 19 is provided in the groove 25. As a result, the surface of the flow diversion plate 19 may be flush with the surface of the third flexible deflector. The surfaces of the flow diversion plate 19 and the third flexible deflector are formed into an integral curved fairing structure, which is more convenient for accommodation of the third flexible deflector.

In the embodiment, two sides of the deck 14 at the bow each are provided with one of the second flexible deflectors 2. The second flexible deflector 2 is correspondingly provided with the accommodation mechanism 18. Working manners of the second flexible deflectors 2 at the two sides of the deck 14 at the bow are basically the same. Herein, descriptions are made only to one second flexible deflector 2. The second flexible deflector 2 in an idle state can be accommodated into the accommodation winding tube 10, without affecting offloading of the cargo on the deck 14 of the ship. When used, the second flexible deflector 2 extends along the guide-track groove 5 to serve as the bulwark. Consequently, the second flexible deflector 2 is used more flexibly, which solves a structural contradiction between a usable area of the deck 14 at the bow of the ship and a flow guiding function of the fairing at the bow to the utmost extent. Preferably, a side from a vertex of a rear end to a vertex of a front end of the second flexible deflector 2 is in an arc shape. The second flexible deflector 2 is the curved plate. The front end of the second flexible deflector 2 refers to an end adjacent to the third flexible deflector 3. The front end is slidably provided in the guide-track groove 5, and slides along the guide-track groove 5 for extension and retraction, while the rear end is fixed on the accommodation winding tube 10.

In the embodiment, the support skeleton is provided with a first guide-track groove 5A and a plurality of second guide-track grooves 5B(C). The first guide-track groove and the second guide-track grooves are arc-shaped. The second guide-track grooves each extend from the port side of the ship to the starboard side of the ship. The second guide-track grooves are arranged at intervals along a length direction of the ship. The first guide-track groove extends from the port side of the ship or the starboard side of the ship. A highest point of the first guide-track groove is lower than a highest point of the second guide-track groove, such that the second flexible deflector 2 has a corresponding extended height lower than that of the third flexible deflector 3. The third flexible deflector 3 is slidably provided in two adjacent second guide-track grooves. The front end of the second flexible deflector 2 is slidably provided in the first guide-track groove. The first guide-track groove is adjacent to the second guide-track groove. The first guide-track groove and the second guide-track groove are arc-shaped. An arc-shaped center of the first guide-track groove and an arc-shaped center of the second guide-track groove are collinear, such that the first guide-track groove has a same arc as the second guide-track groove, with an arc length less than a half of an arc length of the second guide-track groove.

Figure 5:
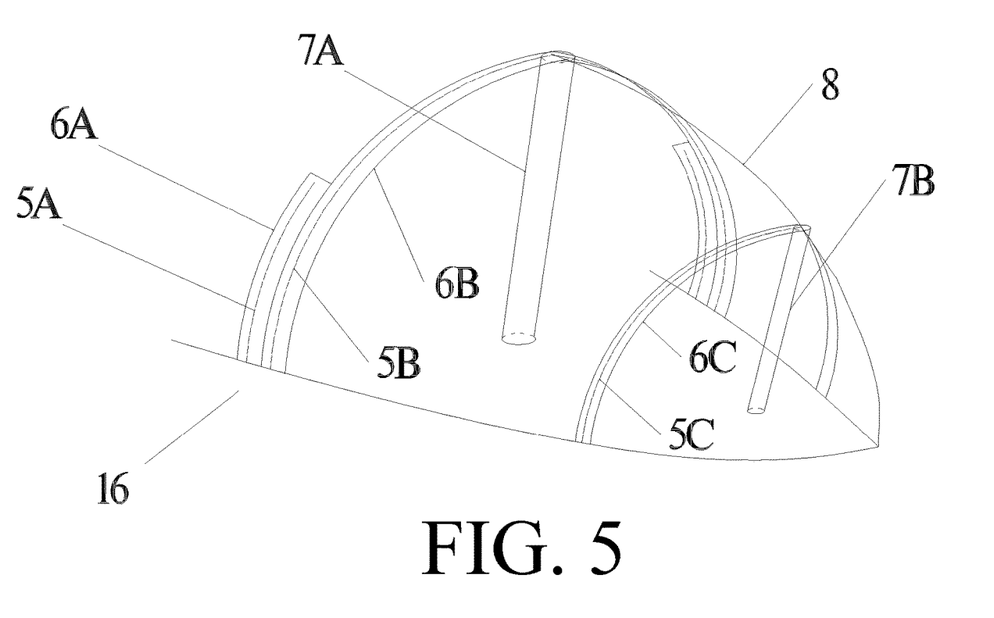
FIG. 5 is a schematic view of a support skeleton in the extendable and retractable fairing for a container ship in FIG. 1.

In the embodiment, as shown in FIG. 5, the support skeleton includes a support beam 7 and a support frame 8. The support frame 8 is a three-dimensional (3D) frame. The support beam 7 includes a bottom fixed on the deck 14 at the bow, and a top abutting against the support frame 8. Two sides of the support frame 8 are fixed with an edge of the deck 14 at the bow. The guide-track grooves 5 are provided on the support frame 8. The support beam 7 can serve as a Z-direction support of the support frame 8. The guide-track grooves 5 are formed into a Y-direction support of the support frame 8. The support frame 8 further includes an X-direction support. The X-direction support is arc-shaped, with an X-direction transverse section being a continuous curve. In terms of a shape, the continuous curve herein is the same as the continuous curve of the X-direction transverse section of the curved fairing body formed by the first flexible deflector 1 and the third flexible deflectors 3.

Figure 6:
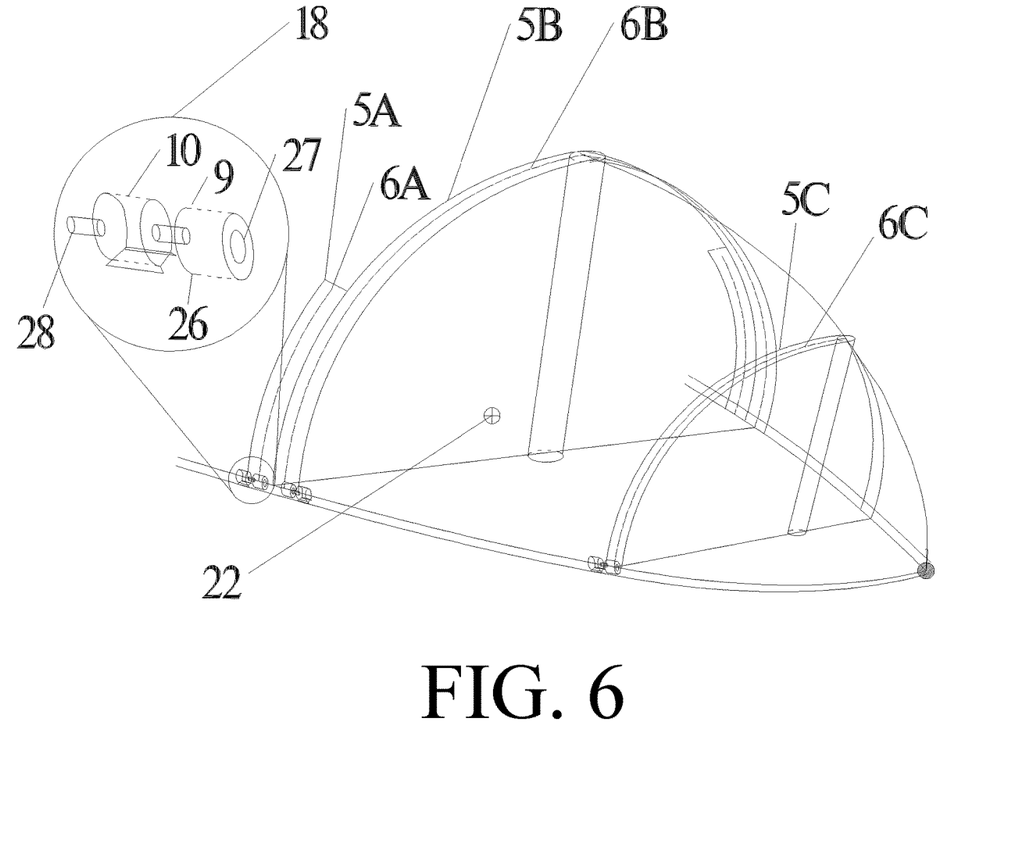
FIG. 6 is a schematic view of an accommodation mechanism in the extendable and retractable fairing for a container ship in FIG. 1.

In the embodiment, as shown in FIG. 6, the accommodation mechanisms 18 each further include an extensible belt 11. The extensible belt 11 includes one end fixed at a side of the deck 14 at the bow provided with the accommodation winding tube 10, and the other end connected to the third flexible deflector 3. In response to extension of the third flexible deflector 3, the extensible belt 11 is tensioned. In response to retraction of the third flexible deflector 3, the extensible belt 11 is loosened. The extensible belt 11 can tension and fix the third flexible deflector 3. In the present disclosure, each third flexible deflector 3 is provided with one accommodation mechanism 18, and the accommodation mechanism 18 is provided with the drive motor 9 and the extensible belt 11. Therefore, a load on the single drive motor 9 and the single extensible belt 11 can be reduced, and a failure rate in extension and retraction of the flexible deflector can be reduced.

In the embodiment, the accommodation winding tube 10 includes a reel 26 and a drum 27. The reel 26 is connected to an output shaft of the drive motor 9. The drum 27 is sleeved at a peripheral side of the reel 26. The drum 27 is fixed with one side of the deck 14 of the ship. The second flexible deflector 2 or the third flexible deflector 3 is wound on the reel 26. An opening for allowing the second flexible deflector 2 or the third flexible deflector 3 to extend and slide out is formed on the drum 27. With the third flexible deflector 3 as an example, when the drive motor 9 drives the reel 26 to rotate clockwise, the third flexible deflector 3 is wound on the reel 26, and accommodated into the drum 27. When the drive motor 9 drives the reel 26 to rotate counterclockwise, the third flexible deflector 3 gradually slides out from the drum 27, and extends slidably along the guide-track groove 5 to cover the deck 14 of the ship.

In the embodiment, the wind velocity detector 17 includes a first wind pressure transducer 17A, and a second wind pressure transducer 17B. The first wind pressure transducer 17A is provided inside the first flexible deflector 1, and configured to measure a static pressure inside the first flexible deflector 1. The second wind pressure transducer 17B is fixed on an outer wall of the first flexible deflector 1, and configured to measure a dynamic pressure outside the first flexible deflector 1. According to the measured static pressure and dynamic pressure, a wind velocity can be calculated by:

$$v = \sqrt{\frac{2(P_{dynamic} - P_{static})}{\rho}}$$

where, v is the wind velocity, $P_{dynamic}$ is the dynamic pressure, $P_{static}$ is the static pressure, and $\rho$ is an air density.

Further, there may be a plurality of the second wind pressure transducers. The second wind pressure transducers are provided at intervals along a circumference of the outer wall of the first flexible deflector 1. When there are a plurality of the second wind pressure transducers, the second wind pressure transducers each measure a dynamic pressure. A wind velocity can be calculated according to the dynamic pressure and the static pressure. A mean for a plurality of the wind velocities serves as a present wind velocity, which is shown by:

$$v = \frac{\sum_{i}^{N} v_i}{N} = \frac{\sum_{i}^{N} \sqrt{\frac{2(P_{dynamic\,i} - P_{static})}{\rho}}}{N}$$

where, v is the wind velocity, i is an index of each of the second wind pressure transducers, N is a total number of the second wind pressure transducers, $v_i$ is a wind velocity of an ith wind pressure transducer, $P_{dynamic\,i}$ is a measured dynamic pressure of the ith wind pressure transducer, $P_{static}$ is a static pressure, and $\rho$ is an air density.

Figure 8:
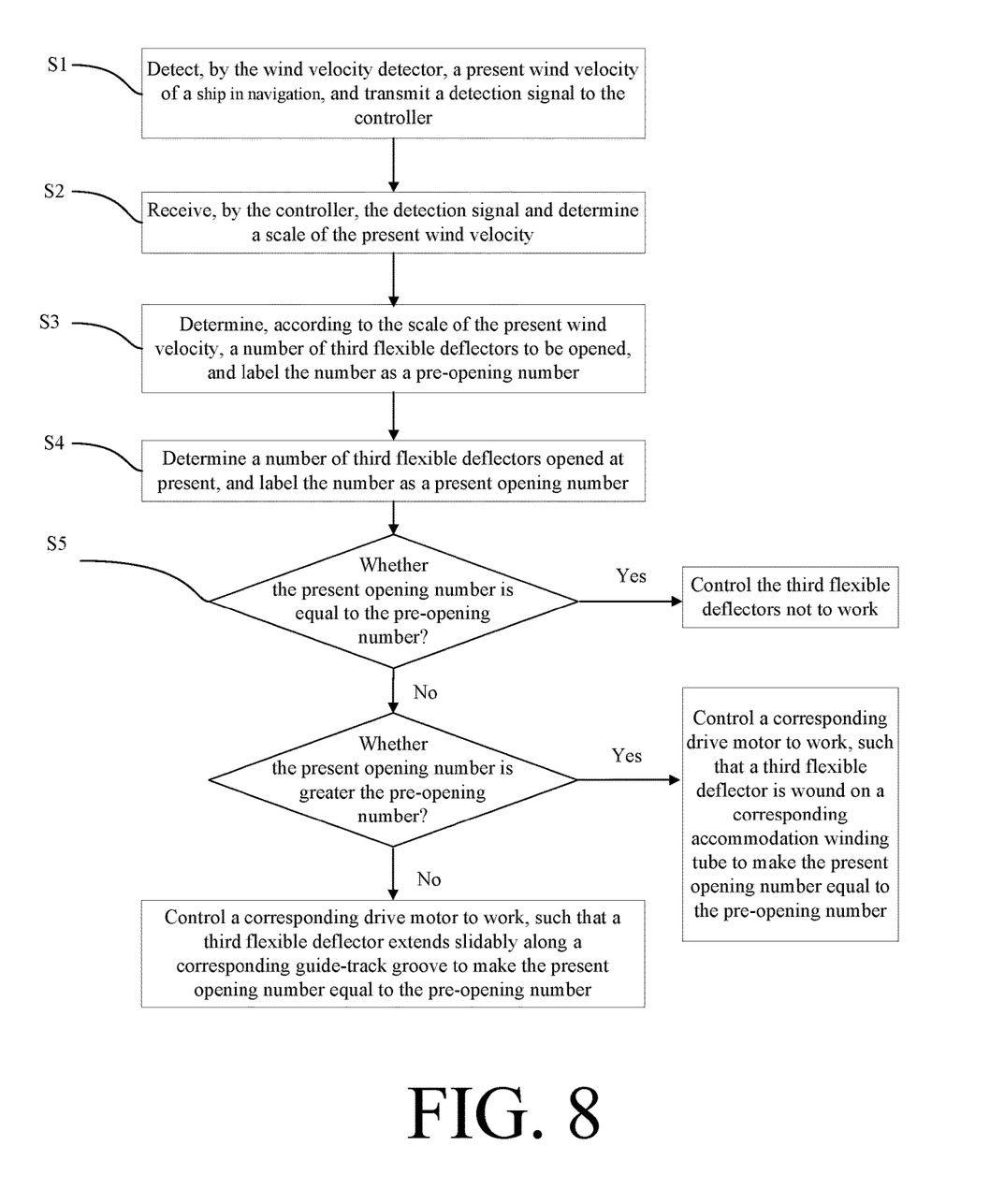
FIG. 8 is a schematic flowchart of a control method of an extendable and retractable fairing for a container ship according to an embodiment of the present disclosure.

As shown in FIG. 8, the present disclosure provides a control method of the extendable and retractable fairing for a container ship, including the following steps:

Step S1: Detect, by the wind velocity detector 17, a present wind velocity of a ship in navigation, and transmit a detection signal to the controller 15.

Step S2: Receive, by the controller 15, the detection signal and determine a scale of the present wind velocity.

Step S3: Determine, according to the scale of the present wind velocity, a number of the third flexible deflectors to be opened, and label the number as a pre-opening number.

Step S4: Determine a number of the third flexible deflectors opened at present, and label the number as a present opening number.

Step S5: Compare the present opening number with the pre-opening number, and determine whether the present opening number is equal to the pre-opening number. If the present opening number is equal to the pre-opening number, control, by the controller 15, the third flexible deflectors 3 not to work. If the present opening number is not equal to the pre-opening number, determine whether the present opening number is greater than the pre-opening number. If the present opening number is greater than the pre-opening number, control a corresponding drive motor 9 to work, such that the third flexible deflector 3 is wound on a corresponding accommodation winding tube 10 to make the present opening number equal to the pre-opening number. If the present opening number is less than the pre-opening number, control a corresponding drive motor 9 to work, such that the third flexible deflector 3 slides along a corresponding guide-track groove 5 to make the present opening number equal to the pre-opening number. For the third flexible deflectors 3, the present opening number is matched with the pre-opening number, such that a number of the third flexible deflectors 3 covering the deck 14 at the bow is matched with a present wind velocity of the ship in navigation. Opened third flexible deflectors are formed into an appropriate fairing body with the first flexible deflector to cover the deck 14 at the bow. Therefore, not only can the airflow field around the hull be improved, but also a phenomenon that a large fairing body covers the deck 14 at the bow to obstruct a ship-handling FOV is prevented.

Step S1 of detecting, by the wind velocity detector 17, a present wind velocity of a ship in navigation includes:

Measure, by a first wind pressure transducer, a static pressure inside the first flexible deflector.

Measure, by a second wind pressure transducer, a dynamic pressure outside the first flexible deflector.

Calculate the present wind velocity according to the static pressure and the dynamic pressure:

$$v = \sqrt{\frac{2(P_{dynamic} - P_{static})}{\rho}}$$

where, v is the present wind velocity, $P_{dynamic}$ is the dynamic pressure, $P_{static}$ is the static pressure, and $\rho$ is an air density.

Further, when there are a plurality of the second wind pressure transducers, the step of detecting, by the wind velocity detector 17, a present wind velocity of a ship in navigation includes:

Measure, by the first wind pressure transducer, a static pressure inside the first flexible deflector.

Measure, by each of the second wind pressure transducers, each of dynamic pressures outside the first flexible deflector.

Calculate, according to the static pressure and each of the dynamic pressures, each of wind velocities corresponding to each of the second wind pressure transducers.

Calculate the present wind velocity according to each of the wind velocities corresponding to each of the second wind pressure transducers:

$$v = \frac{\sum_{i}^{N} v_i}{N} = \frac{\sum_{i}^{N} \sqrt{\frac{2(P_{dynamic\,i} - P_{static})}{\rho}}}{N}$$

where, v is the present wind velocity, i is an index of each of the second wind pressure transducers, N is a total number of the second wind pressure transducers, $P_{dynamic\,i}$ is a measured dynamic pressure of the ith wind pressure transducer, $P_{static}$ is a static pressure, and ρ is an air density.

In Step S2, the scale of the wind velocity can be divided according to a magnitude of the wind velocity. Each scale is correspondingly provided with a pre-opening number. According to Beaufort scales and working conditions of the ship, there are five scales optimally, including first to fifth scales from low to high. For example, 0-4 Beaufort scales are the first scale of wind velocity of the ship. In case of the first scale of wind velocity, only the first flexible deflector 1 can be opened, and the pre-opening number of the third flexible deflectors 3 is 0. In case of the second or third scale of wind velocity, the pre-opening number of the third flexible deflectors 3 may be set as 1. In case of the fourth scale of wind velocity, the pre-opening number of the third flexible deflectors 3 may be set as 2. In case of the fifth scale of wind velocity, the pre-opening number of the third flexible deflectors 3 may be set as 3. It is to be noted that when the third flexible deflectors 3 are opened, the third flexible deflectors 3 are opened one by one from the bow to the stern, such that opened third flexible deflectors 3 and the first flexible deflector 1 are always formed into a curved fairing body.

Preferably, a position transducer 28 is provided at one side of each guide-track groove 5 of the support skeleton. The position transducer 28 is configured to sense a position of the third flexible deflector 3. The position transducer 28 is electrically connected to the controller 15. When the third flexible deflector 3 slides from one side of the guide-track groove 5 to the other side, the third flexible deflector 3 triggers the position transducer 28 to send an inductive signal to the controller 15. In Step S4, the number of the third flexible deflectors 3 opened at present can be determined according to a number of position transducers 28 sending inductive signals.

It is to be noted that other specific implementations of the control method for the extendable and retractable fairing for a container ship are approximately the same as specific implementations of the extendable and retractable fairing for a container ship, and will not be repeatedly described herein.

The above are only preferred implementations of the present disclosure. It should be noted that several improvements and replacements may further be made by a person of ordinary skill in the art without departing from the principle of the present disclosure, and such improvements and replacements should also be deemed as falling within the protection scope of the present disclosure.

The invention claimed is:

1. An extendable and retractable fairing for a container ship, comprising a controller, a support skeleton, a wind velocity detector, a first flexible deflector, second flexible deflectors, a plurality of third flexible deflectors, and a plurality of accommodation mechanisms, wherein the first flexible deflector is fixed at a front end of a deck at a bow, and a front end of the first flexible deflector is coincided to a preset point at the front end of the deck at the bow; the second flexible deflectors are respectively provided at two sides of a rear end of the deck at the bow; the plurality of the third flexible deflectors are sequentially arranged between the first flexible deflector and the second flexible deflectors; a highest point of each of the second flexible deflectors is lower than a highest point of an adjacent one of the third flexible deflectors; and a cavity is formed therebetween the first flexible deflector, the third flexible deflectors, and the deck at the bow;

the support skeleton comprises a plurality of guide-track grooves that are provided at intervals; and the second flexible deflectors and the third flexible deflectors each are slidably provided in a corresponding guide-track groove;

the accommodation mechanisms each comprise an accommodation winding tube, and a drive motor; the accommodation winding tube is provided at one side of the deck at the bow; and the drive motor is in transmission connection with the accommodation winding tube;

the wind velocity detector is provided on the first flexible deflector, and configured to measure a wind velocity;

the wind velocity detector and the drive motor are electrically connected to the controller; the second flexible deflector and the third flexible deflector each are provided in the corresponding accommodation winding tube in a winding manner; and the controller controls, according to a detection signal of the wind velocity detector, the drive motor to drive the accommodation winding tube to rotate, such that the second flexible deflector or the third flexible deflector extends slidably along the corresponding guide-track groove, or the second flexible deflector and the third flexible deflector each are wound on the corresponding accommodation winding tube;

the first flexible deflector and the third flexible deflector each are provided thereon with a plurality of flow guide mechanisms; and the flow guide mechanisms are provided at intervals along an arc surface of the first flexible deflector or the third flexible deflector; and the flow guide mechanisms each comprise a flow diversion plate, elastic members, an air bag, and an air charging-discharging device; the flow diversion plate is a curved plate, and is provided on a surface of the first flexible deflector or the third flexible deflector; two ends of the flow diversion plate each are provided with one elastic member; the elastic member is fixed between the flow diversion plate and the first flexible deflector or the third flexible deflector; the air bag is provided between the flow diversion plate and the first flexible deflector or the third flexible deflector, and located between two elastic members; the air bag is connected to the air charging-discharging device to charge air to the air bag or discharge air from the air bag, such that the flow diversion plate is protruded out of or attached to the surface of the first flexible deflector or the third flexible deflector; a flow guide groove is formed between two adjacent air bags; the flow guide groove on the third flexible deflector is in one-to-one correspondence with the flow guide groove on the first flexible deflector; and the two corresponding flow guide grooves communicate with each other.

2. The extendable and retractable fairing for a container ship according to claim 1, wherein the wind velocity detector comprises a first wind pressure transducer and a second wind pressure transducer; the first wind pressure transducer is provided inside the first flexible deflector, and configured to measure a static pressure inside the first flexible deflector; and the second wind pressure transducer is fixed on an outer wall of the first flexible deflector, and configured to measure a dynamic pressure outside the first flexible deflector.

3. The extendable and retractable fairing for a container ship according to claim 2, wherein there are a plurality of the second wind pressure transducers; and the plurality of the second wind pressure transducers are provided at intervals along a circumference of the outer wall of the first flexible deflector.

4. The extendable and retractable fairing for a container ship according to claim 1, wherein the accommodation mechanisms each further comprise an extensible belt; the extensible belt comprises one end fixed at a side of the deck at the bow provided with the accommodation winding tube, and the other end connected to the third flexible deflector; in response to extension of the third flexible deflector, the extensible belt is tensioned; and in response to retraction of the third flexible deflector, the extensible belt is loosened.

5. The extendable and retractable fairing for a container ship according to claim 1, wherein the support skeleton comprises a support beam and a support frame; the support beam comprises a bottom fixed on the deck at the bow, and a top abutting against the support frame; two sides of the support frame are fixed with an edge of the deck at the bow; and the guide-track grooves are provided on the support frame.

6. The extendable and retractable fairing for a container ship according to claim 1, wherein the first flexible deflector, the second flexible deflectors and the third flexible deflectors each are a curved plate; and the first flexible deflector and the plurality of third flexible deflectors are formed into a curved fairing body.

7. The extendable and retractable fairing for a container ship according to claim 6, wherein a side from a vertex of a rear end to a vertex of a front end of the second flexible deflector is in an arc shape.

8. A control method of the extendable and retractable fairing for a container ship according to claim 1, comprising following steps:
step S1: detecting, by the wind velocity detector, a present wind velocity of a ship in navigation, and transmitting a detection signal to the controller;
step S2: receiving, by the controller, the detection signal and determining a scale of the present wind velocity;
step S3: determining, according to the scale of the present wind velocity, a number of the third flexible deflectors to be opened, and labeling the number as a pre-opening number;
step S4: determining a number of the third flexible deflectors opened at present, and labeling the number as a present opening number; and
step S5: comparing the present opening number with the pre-opening number; controlling, if the present opening number is less than the pre-opening number, a corresponding drive motor to work, such that the third flexible deflector extends slidably along a corresponding guide-track groove to make the present opening number equal to the pre-opening number; and controlling, if the present opening number is greater than the pre-opening number, a corresponding drive motor to work, such that the third flexible deflector is wound on a corresponding accommodation winding tube to make the present opening number equal to the pre-opening number.

9. A control method of the extendable and retractable fairing for a container ship according to claim 2, comprising following steps:
step S1: detecting, by the wind velocity detector, a present wind velocity of a ship in navigation, and transmitting a detection signal to the controller;
step S2: receiving, by the controller, the detection signal and determining a scale of the present wind velocity;
step S3: determining, according to the scale of the present wind velocity, a number of the third flexible deflectors to be opened, and labeling the number as a pre-opening number;
step S4: determining a number of the third flexible deflectors opened at present, and labeling the number as a present opening number; and step S5: comparing the present opening number with the pre-opening number; controlling, if the present opening number is less than the pre-opening number, a corresponding drive motor to work, such that the third flexible deflector extends slidably along a corresponding guide-track groove to make the present opening number equal to the pre-opening number; and controlling, if the present opening number is greater than the pre-opening number, a corresponding drive motor to work, such that the third flexible deflector is wound on a corresponding accommodation winding tube to make the present opening number equal to the pre-opening number.

10. A control method of the extendable and retractable fairing for a container ship according to claim 3, comprising following steps:
    step S1: detecting, by the wind velocity detector, a present wind velocity of a ship in navigation, and transmitting a detection signal to the controller;
    step S2: receiving, by the controller, the detection signal and determining a scale of the present wind velocity;
    step S3: determining, according to the scale of the present wind velocity, a number of the third flexible deflectors to be opened, and labeling the number as a pre-opening number;
    step S4: determining a number of the third flexible deflectors opened at present, and labeling the number as a present opening number; and
    step S5: comparing the present opening number with the pre-opening number; controlling, if the present opening number is less than the pre-opening number, a corresponding drive motor to work, such that the third flexible deflector extends slidably along a corresponding guide-track groove to make the present opening number equal to the pre-opening number; and controlling, if the present opening number is greater than the pre-opening number, a corresponding drive motor to work, such that the third flexible deflector is wound on a corresponding accommodation winding tube to make the present opening number equal to the pre-opening number.

11. A control method of the extendable and retractable fairing for a container ship according to claim 4, comprising following steps:
    step S1: detecting, by the wind velocity detector, a present wind velocity of a ship in navigation, and transmitting a detection signal to the controller;
    step S2: receiving, by the controller, the detection signal and determining a scale of the present wind velocity;
    step S3: determining, according to the scale of the present wind velocity, a number of the third flexible deflectors to be opened, and labeling the number as a pre-opening number;
    step S4: determining a number of the third flexible deflectors opened at present, and labeling the number as a present opening number; and
    step S5: comparing the present opening number with the pre-opening number; controlling, if the present opening number is less than the pre-opening number, a corresponding drive motor to work, such that the third flexible deflector extends slidably along a corresponding guide-track groove to make the present opening number equal to the pre-opening number; and controlling, if the present opening number is greater than the pre-opening number, a corresponding drive motor to work, such that the third flexible deflector is wound on a corresponding accommodation winding tube to make the present opening number equal to the pre-opening number.

12. A control method of the extendable and retractable fairing for a container ship according to claim 5, comprising following steps:
    step S1: detecting, by the wind velocity detector, a present wind velocity of a ship in navigation, and transmitting a detection signal to the controller;
    step S2: receiving, by the controller, the detection signal and determining a scale of the present wind velocity;
    step S3: determining, according to the scale of the present wind velocity, a number of the third flexible deflectors to be opened, and labeling the number as a pre-opening number;
    step S4: determining a number of the third flexible deflectors opened at present, and labeling the number as a present opening number; and
    step S5: comparing the present opening number with the pre-opening number; controlling, if the present opening number is less than the pre-opening number, a corresponding drive motor to work, such that the third flexible deflector extends slidably along a corresponding guide-track groove to make the present opening number equal to the pre-opening number; and controlling, if the present opening number is greater than the pre-opening number, a corresponding drive motor to work, such that the third flexible deflector is wound on a corresponding accommodation winding tube to make the present opening number equal to the pre-opening number.

13. A control method of the extendable and retractable fairing for a container ship according to claim 6, comprising following steps:
    step S1: detecting, by the wind velocity detector, a present wind velocity of a ship in navigation, and transmitting a detection signal to the controller;
    step S2: receiving, by the controller, the detection signal and determining a scale of the present wind velocity;
    step S3: determining, according to the scale of the present wind velocity, a number of the third flexible deflectors to be opened, and labeling the number as a pre-opening number;
    step S4: determining a number of the third flexible deflectors opened at present, and labeling the number as a present opening number; and
    step S5: comparing the present opening number with the pre-opening number; controlling, if the present opening number is less than the pre-opening number, a corresponding drive motor to work, such that the third flexible deflector extends slidably along a corresponding guide-track groove to make the present opening number equal to the pre-opening number; and controlling, if the present opening number is greater than the pre-opening number, a corresponding drive motor to work, such that the third flexible deflector is wound on a corresponding accommodation winding tube to make the present opening number equal to the pre-opening number.

14. A control method of the extendable and retractable fairing for a container ship according to claim 7, comprising following steps:
    step S1: detecting, by the wind velocity detector, a present wind velocity of a ship in navigation, and transmitting a detection signal to the controller;
    step S2: receiving, by the controller, the detection signal and determining a scale of the present wind velocity;

step S3: determining, according to the scale of the present wind velocity, a number of the third flexible deflectors to be opened, and labeling the number as a pre-opening number;

step S4: determining a number of the third flexible deflectors opened at present, and labeling the number as a present opening number; and step S5: comparing the present opening number with the pre-opening number; controlling, if the present opening number is less than the pre-opening number, a corresponding drive motor to work, such that the third flexible deflector extends slidably along a corresponding guide-track groove to make the present opening number equal to the pre-opening number; and controlling, if the present opening number is greater than the pre-opening number, a corresponding drive motor to work, such that the third flexible deflector is wound on a corresponding accommodation winding tube to make the present opening number equal to the pre-opening number.

15. The control method of the extendable and retractable fairing for a container ship according to claim 8, wherein the detecting, by the wind velocity detector, a present wind velocity of a ship in navigation comprises:
    measuring, by a first wind pressure transducer, a static pressure inside the first flexible deflector;
    measuring, by a second wind pressure transducer, a dynamic pressure outside the first flexible deflector; and
    calculating the present wind velocity according to the static pressure and the dynamic pressure.

16. The control method of the extendable and retractable fairing for a container ship according to claim 9, wherein the detecting, by the wind velocity detector, a present wind velocity of a ship in navigation comprises:
    measuring, by a first wind pressure transducer, a static pressure inside the first flexible deflector;
    measuring, by a second wind pressure transducer, a dynamic pressure outside the first flexible deflector; and
    calculating the present wind velocity according to the static pressure and the dynamic pressure.

17. The control method of the extendable and retractable fairing for a container ship according to claim 10, wherein the detecting, by the wind velocity detector, a present wind velocity of a ship in navigation comprises:
    measuring, by a first wind pressure transducer, a static pressure inside the first flexible deflector;
    measuring, by a second wind pressure transducer, a dynamic pressure outside the first flexible deflector; and
    calculating the present wind velocity according to the static pressure and the dynamic pressure.

18. The control method of the extendable and retractable fairing for a container ship according to claim 15, wherein when there are a plurality of the second wind pressure transducers, the detecting, by the wind velocity detector, a present wind velocity of a ship in navigation comprises:
    measuring, by the first wind pressure transducer, a static pressure inside the first flexible deflector;
    measuring, by each of the second wind pressure transducers, each of dynamic pressures outside the first flexible deflector;
    calculating, according to the static pressure and each of the dynamic pressures, each of wind velocities corresponding to each of the second wind pressure transducers; and
    calculating the present wind velocity according to each of the wind velocities corresponding to each of the second wind pressure transducers.

19. The control method of the extendable and retractable fairing for a container ship according to claim 16, wherein when there are a plurality of the second wind pressure transducers, the detecting, by the wind velocity detector, a present wind velocity of a ship in navigation comprises:
    measuring, by the first wind pressure transducer, a static pressure inside the first flexible deflector;
    measuring, by each of the second wind pressure transducers, each of dynamic pressures outside the first flexible deflector;
    calculating, according to the static pressure and each of the dynamic pressures, each of wind velocities corresponding to each of the second wind pressure transducers; and
    calculating the present wind velocity according to each of the wind velocities corresponding to each of the second wind pressure transducers.

20. The control method of the extendable and retractable fairing for a container ship according to claim 17, wherein when there are a plurality of the second wind pressure transducers, the detecting, by the wind velocity detector, a present wind velocity of a ship in navigation comprises:
    measuring, by the first wind pressure transducer, a static pressure inside the first flexible deflector;
    measuring, by each of the second wind pressure transducers, each of dynamic pressures outside the first flexible deflector;
    calculating, according to the static pressure and each of the dynamic pressures, each of wind velocities corresponding to each of the second wind pressure transducers; and
    calculating the present wind velocity according to each of the wind velocities corresponding to each of the second wind pressure transducers.

\* \* \* \* \*